United States Patent [19]

Akashi

[11] 4,110,890
[45] Sep. 5, 1978

[54] METHOD OF MANUFACTURING SLIDE FASTENERS

[75] Inventor: Shunji Akashi, Kurobe, Japan

[73] Assignee: Yoshida Kogyo K.K., Japan

[21] Appl. No.: 814,150

[22] Filed: Jul. 11, 1977

[30] Foreign Application Priority Data

Jul. 12, 1976 [JP] Japan .................. 51/82667

[51] Int. Cl.² .......................... B23P 11/00
[52] U.S. Cl. ..................... 29/408; 29/33.2;
29/766; 29/767; 264/252; 425/DIG. 34
[58] Field of Search ............ 29/408, 409, 766, 767,
29/768, 33.2; 425/DIG. 34, 397; 264/252

[56] References Cited

U.S. PATENT DOCUMENTS

| 2,989,751 | 6/1961 | Schevermann | 29/33.2 |
| 3,190,779 | 6/1965 | Porepp | 29/408 X |
| 3,340,594 | 9/1967 | Fröhlich et al. | 29/408 |
| 3,353,256 | 11/1967 | Fröhlich et al. | 29/408 |
| 3,485,691 | 12/1969 | Waldes | 29/408 X |
| 3,698,064 | 10/1972 | Uhrig | 29/408 |
| 3,714,698 | 2/1973 | Fukuroi | 29/408 |

*Primary Examiner*—Victor A. DiPalma
*Attorney, Agent, or Firm*—Bucknam and Archer

[57] ABSTRACT

Individual slide fasteners are manufactured from a pair of continuous slide fastener stringers having stringer tapes made of a fabric including thermoplastic synthetic fibers. While being advanced intermittently in the longitudinal direction, the stringers are stamped out to form an element-free gap therein and cut to sever off an individual slide fastener length simultaneously at a first station with the application of heat to fuse and solidify the cut end against reveling. A bottom end stop is mounted on the cut end portion of the severed slide fastener length also at the first station. During advancing movement from the first station, the fastener chain is threaded through a slider fixedly supported between the first station and a second station located downstream of the first station. A top end stop is mounted on the cut end portion of the continuous slide fastener stringers at the second station simultaneously with the steps repeated at the first station.

2 Claims, 8 Drawing Figures

METHOD OF MANUFACTURING SLIDE FASTENERS

BACKGROUND OF THE INVENTION

1. Field of the Invention

The present invention relates to a method of manufacturing slide fasteners from a pair of slide fastener stringers of continuous or substantially endless length.

2. Prior Art

Various attempts have been made to remove helically coiled or meandering type fastener elements which are sewn to a pair of continuous slide fastener stringers, thereby providing element-free gaps in the slide fastener chain. To accomplish such element removal, it is known to cut off coupling heads of the fastener elements to be taken out, and then to pull out their leg portions from the sewing threads, so as to allow the sewing threads to remain unbroken, holding adjacent fastener elements stably against sticking up or separation from the stringer tapes. This attempt, however, must be performed by relatively complicated apparatus.

According to another effort, a film of thermoplastic synthetic resin is bonded to a pair of slide fastener stringers so as to extend across and over the slide fastener chain. The bonded film is then cut to provide an element-free space therein, so that the cut edge can be prevented from fraying during handling and use. With this process, the step of applying a film is necessary independently of the space cutting step, and the film residual on the stringers tends to obstruct the passage therethrough of a sewing needle when the slide fastener is to be sewn onto a garment.

To find a way out of these problems, a fabric formed of thermoplastic synthetic fibers or their blended yarn has been proposed for use as slide fastener stringer tapes. A group of fastener elements corresponding to a desired length are first cut away from such stringer tapes with the sewing threads being left on the tape. A portion of the tapes which has an element-free edge is then cut out to provide a space therein. Simultaneously with the space formation, the cut edge of the tapes is heat-treated such as by a high-frequency welder, so as to be fraying-free. This arrangement, however, also involves two space-forming steps to work with, thus adversely affecting the rate of production. Further, the element-free edges of the tapes have loose sewing threads that permit adjacent fastener elements to come off and act as a barrier when attaching a slider onto the slide fastener chain.

SUMMARY OF THE INVENTION

According to this invention, an element-free gap is provided by stamping out a pair of continuous slide fastener stringers at a first station. Simultaneously with the gap formation, the stringers are cut along a line extending transversely thereof and substantially centrally of the gap, to thereby sever off an individual slide fastener length. The stringers have tapes made of a fabric including thermoplastic synthetic fibers, and the steps of providing the gap and of cutting the stringers are carried out with the application of heat, so that the cut edges are prevented from fraying. A bottom end stop is mounted on the cut end portion of the individual slide fastener length concurrently with the step of providing the element-free gap. During advancing movement of the stringers from the first station, a slider is applied onto the slide fastener chain of the stringers. A top end stop is mounted on the cut end portion of the stringers at a second station located downstream of the first station. The step of mounting the top end stop is carried out simultaneously with the repeated step of cutting the stringers to sever off an individual slide fastener length at the first station.

An object of the present invention is to provide a method of manufacturing slide fasteners from a pair of continuous slide fastener stringers, the method comprising several steps to be carried out simultaneously at one station to simplify and shorten the overall process.

Another object of the present invention is to provide a method of manufacturing slide fasteners from a pair of continuous slide fastener stringers, the method comprising steps to be carried out at different stations at the same time.

Still another object of the present invention is to provide a method of manufacturing slide fasteners from a pair of continuous slide fastener stringers, the method comprising the steps arranged to save energy and labor.

These and other objects of the present invention will be more apparent from the following description when taken in conjunction with the accompanying drawings.

DETAILED DESCRIPTION OF THE PREFERRED EMBODIMENTS

Figure 1:
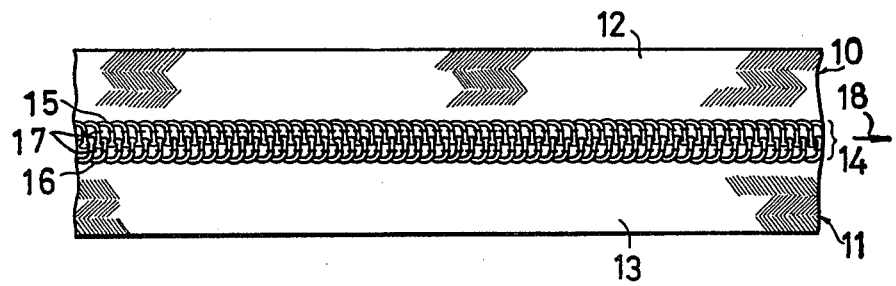
FIG. 1 is a fragmentary plan view of a pair of continuous slide fastener stringers having a chain, from which stringers individual slide fasteners are manufactured according to a method of this invention.

FIG. 1 shows a pair of slide fastener stringers 10,11 of continuous or substantially endless length, comprising a pair of stringer tapes 12,13, respectively, each formed of a woven or knitted fabric made up of thermoplastic synthetic fibers or their blended yarn, and a fastener chain 14 having a pair of interengaged rows of fastener elements 15,16 made of synthetic resin, the rows of fastener elements 15,16 being sewn with threads 17 to the opposed longitudinal edges of the stringer tapes 12,13. The sewing threads 17 are made of thermoplastic synthetic fibers or their blended yarn. Although the fastener elements 15,16 are shown to be helically coiled, they may be of the meandering type.

For manufacturing individual slide fasteners, the fastener stringers 10,11 are moved face up in the longitudinal direction of the one-headed arrow 18. The movement of the fastener stringers 10,11 is intermittent and is arranged to advance them a distance corresponding to the length of the individual fastener.

Figure 2:
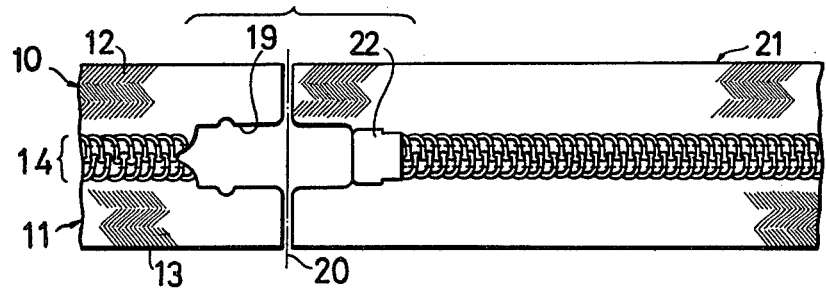
FIG. 2 is a fragmentary plan view of the stringers having an element-free gap and a bottom end stop, the stringers being cut to sever off a slide fastener length.

While the fastener stringers 10,11 are at rest between intermittent movements at a first station, an element-free gap or space 19 is provided by stamping out the stringers 10,11, as shown in FIG. 2, the gap 19 having a width equal at least to that of the fastener chain 14 such that no elements and no sewing threads are left on a portion of the stringers 10,11 in which the gap 19 is defined. The gap 19 is substantially rectangular in configuration and has one end shaped in the form of a V to facilitate subsequent attachment of a slider onto the fastener chain 14.

Simultaneously with the formation of gap 19, the fastener stringers 10,11 are cut along a line 20 extending transversely of the stringers 10,11 and substantially centrally of the gap 19, whereby an individual slide fastener length 21 is severed off the continuous slide fastener stringers 10,11.

The stamping-out and cutting operation of the fastener stringers 10,11 is effected by means of a punch as described below with heat generated as by a high-frequency or an ultrasonic welder, or an electric heater which enables the cut ends of the tapes, elements, and sewing threads to be fused, the cut ends being on cooling solidified to prevent fraying of the tape fabric yarns and sticking up of the fastener elements 15,16 from the stringer tapes 12,13.

A bottom end stop 22 is mounted on the cut end of the fastener chain of the individual slide fastener length 21 also at the first station.

Figure 3:
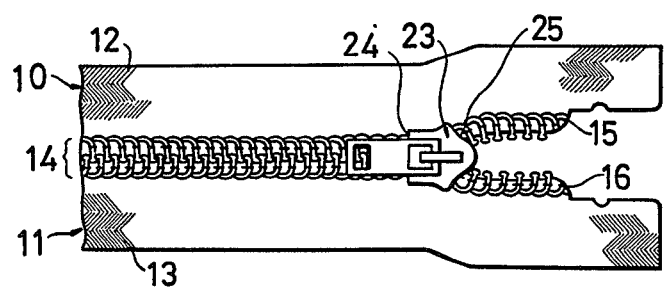
FIG. 3 is a fragmentary plan view of the stringers having a cut end portion from which a slider is threaded onto the chain.
Figure 4:
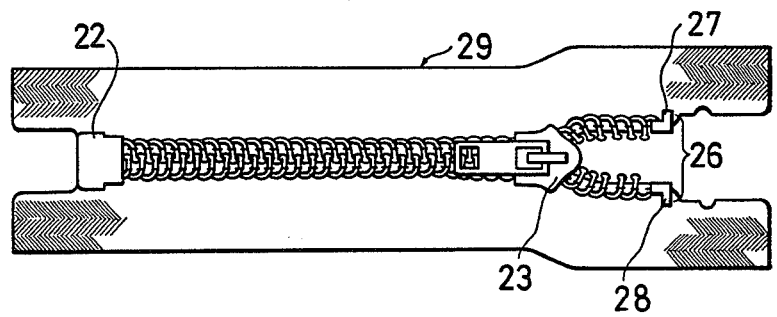
FIG. 4 is a plan view of a completed slide fastener.

Then, the fastener stringers 10,11 are advanced as by grips (not shown) from the first station to a downstream second station. During the advancing movement, the slide fastener chain 14 is threaded through a slider 23 (FIG. 3) fixedly mounted on a support (not shown) disposed somewhere between the first station and the second station. The slider 23 has a rear end 24 where the chain 14 or the coupled rows of elements 15,16 enter the slider 23 and a front end 25 where the separated rows of elements 15,16 go out of the slider 23. With this orientation of the slider 23, the rows of elements 15,16 on the stringers 10,11 are partly disengaged from each other upon arrival at the second station. At the second station, a top end stop 26 comprising a pair of stop members 27,28 is mounted on the cut end of the fastener chain 14 of the continuous slide fastener stringers 10,11, as illustrated in FIG. 4. The attachment of the top end stop 26 is carried out simultaneously with the steps effected at the first station, such as forming the gap 19 and cutting apart the stringers 10,11, to thereby save energy and labor.

Accordingly, a completed slide fastener 29 is produced at the time of severing the fastener stringers 10,11 at the first station. The slide fastener 29 is fed out as by grips (not shown) for storage as the continuous fastener stringers 10,11 are progressively moved forward for the slider attachment operation.

Figure 5:
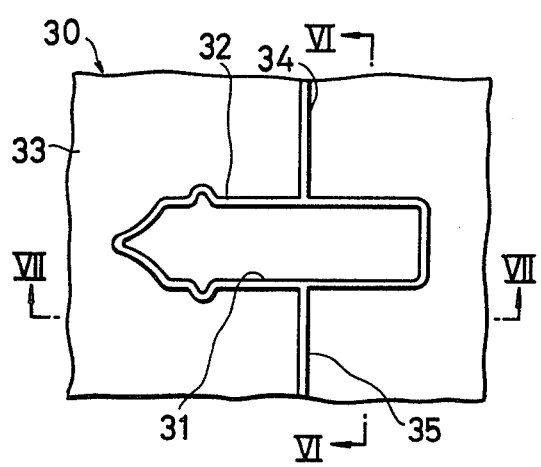
FIG. 5 is an enlarged plan view of a punch for forming an element-free gap in a pair of slide fastener stringers and cutting the stringers.
Figure 6:
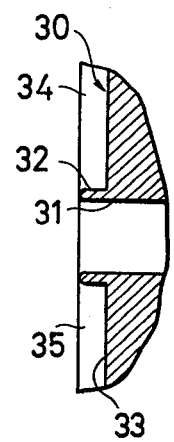
FIG. 6 is a cross-sectional view taken along line VI — VI of FIG. 5.
Figure 7:
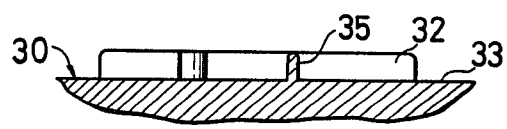
FIG. 7 is a cross-sectional view taken along line VII — VII of FIG. 5.

FIGS. 5 through 7 illustrate a punch 30 for stamping out and cutting the fastener stringers 10,11 at the first station. The punch 30 has an opening or cavity 31 therein and a blade 32 projecting from an end face 33 and disposed around the open end of the cavity 31. The surrounding blade 32 is identical in contour with a gap to be formed in the stringers 10,11. A pair of aligned straight blades 34,35 project from the end face 33 and extend at a right angle to the sides of the blade 32. The straight blades 34,35 are located substantially centrally of the length of the blade 32.

Figure 8:
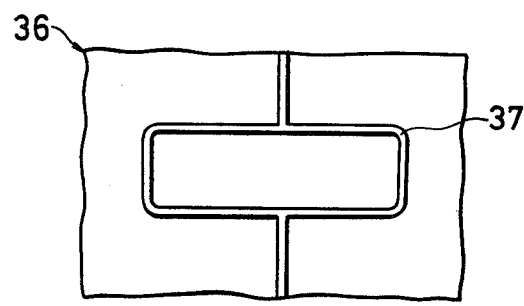
FIG. 8 is an enlarged plan view of a modification of the punch.

According to a modified punch 36 shown in FIG. 8, a blade 37 is in the form of a rectangle.

The bottom end stop 22 as illustrated in FIG. 2 is formed by placing a film of plastic material over a selected position on the fastener chain 14 and bringing a bottom portion of the punch 30(36) into pressing contact with the film for fusion-bonding of the latter to the fastener chain 14. Alternatively, an injection-molding nozzle may be provided for timed downward movement with the punch 30(36) toward a mold mounted on the fastener chain 14. At the lowered position, a plastic material in melted state is forced through the nozzle into the mold in which it solidifies into the bottom end stop 22.

The bottom end stop 22 may however be preformed separately and attached to the fastener chain 14 as by adhesive-bonding or fusion-bonding. Otherwise, the bottom end stop 22 may be provided with downward prongs on its bottom surface, the prongs being staked after penetrating the stringer tapes 12,13.

The top end stop 26 is formed at the second station in substantially the same manner as with the bottom end stop 22.

While preferred embodiments have been described and illustrated, it is to be understood that changes and modifications may be made therein without departing from the scope of the appended claims.

What I claim is:

1. A method of manufacturing individual slide fasteners from a pair of continuous slide fastener stringers having a pair of stringer tapes made of a fabric including thermoplastic synthetic fibers and a slide fastener chain including a pair of interengaged rows of fastener elements mounted on and along the confronting edges, respectively, of said stringer tapes, comprising the steps of:

(a) feeding said continuous slide fastener stringers intermittently for a distance corresponding to a desired fastener length;

(b) providing an element-free gap in said continuous slide fastener stringers with heat at a first station while said stringers are at rest between intermittent movements, said element-free gap being equal in width at least to said slide fastener chain;

(c) simultaneously with the gap providing step, cutting said continuous slide fastener stringers with heat at said first station along a line extending across said stringers and substantially centrally of said element-free gap, whereby an individual slide fastener length is severed off said continuous slide fastener stringers;

(d) simultaneously with the gap providing step, mounting a bottom end stop on the cut end portion of said individual slide fastener length at said first station;

(e) threading a slider through said slide fastener chain from the cut end portion of said continuous slide fastener stringers while the latter are being advanced from said first station; and (f) mounting a top end stop on the cut end portion of said continuous slide fastener stringers while at rest at a second station located downstream of said first station.

2. A method according to claim 1, said step of mounting a top end stop being carried out simultaneously with the step of cutting and continuous slide fastener stringers to sever off an ensuing individual slide fastener length.

* * * * *